United States Patent [19]

Konomi et al.

[11] Patent Number: 4,525,781
[45] Date of Patent: Jun. 25, 1985

[54] METHOD OF DETERMINING FLUCTUATIONS IN INDICATED MEAN EFFECTIVE PRESSURE OF ENGINE AND APPARATUS THEREFOR

[75] Inventors: Toshiaki Konomi; Shinobu Ishiyama, both of Shizuoka, Japan

[73] Assignee: Toyota Jidosha Kogyo Kabushiki Kaisha, Toyota, Japan

[21] Appl. No.: 305,352

[22] Filed: Sep. 24, 1981

[30] Foreign Application Priority Data

Oct. 1, 1980 [JP] Japan .................... 55-136995

[51] Int. Cl.³ .................... G01M 15/00; G06F 15/36
[52] U.S. Cl. .................... 364/431.01; 73/115; 364/558
[58] Field of Search ............... 73/117.3, 115; 364/200, 364/900, 431.01, 558

[56] References Cited

U.S. PATENT DOCUMENTS

| | | | |
|---|---|---|---|
| 3,375,711 | 4/1968 | Ives et al. ............... | 73/115 |
| 4,049,349 | 9/1977 | Wennerstrom ............ | 73/117.3 |
| 4,111,041 | 9/1978 | Rice ......................... | 73/115 |
| 4,197,767 | 4/1980 | Leung ...................... | 364/569 |
| 4,301,678 | 11/1981 | Full et al. ................ | 73/116 |
| 4,375,668 | 3/1983 | Leung et al. ............. | 364/431.08 |

Primary Examiner—Felix D. Gruber
Attorney, Agent, or Firm—Cushman, Darby & Cushman

[57] ABSTRACT

A method of and an apparatus for measuring fluctuations in the indicated mean effective pressure of an engine from a deviation of the mean pressure or from an unbiased variance (mean square) of the mean pressure obtained from the deviation in the mean pressure by utilizing a deviation of the mean pressure becomes substantially identical with a deviation of the indicated mean effective pressure or an unbiased variance (mean square) of this mean pressure becomes substantially identical with an unbiased variance (mean square) of the indicated mean effective pressure in a cylinder of the engine. This deviation of the mean pressure is calculated from detected changes in the rotational speed of the engine.

8 Claims, 12 Drawing Figures

FIG. 3
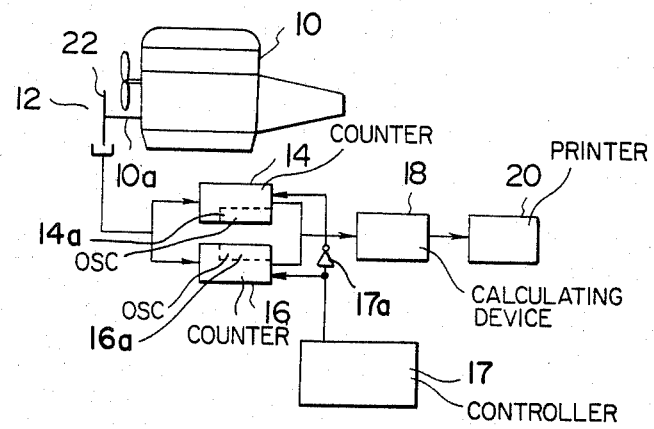
FIG. 4
FIG. 5
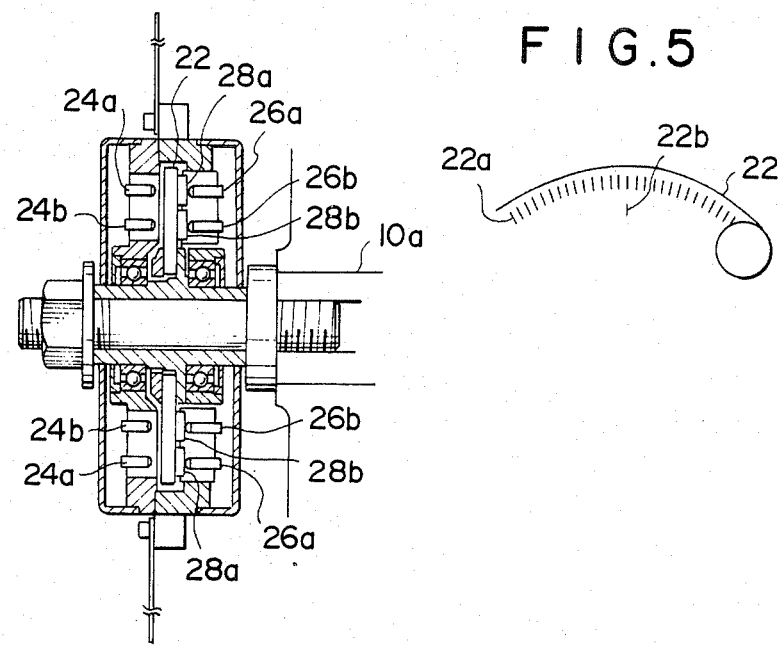

METHOD OF DETERMINING FLUCTUATIONS IN INDICATED MEAN EFFECTIVE PRESSURE OF ENGINE AND APPARATUS THEREFOR

BACKGROUND OF THE INVENTION

1. Field of the Invention

This invention relates to a method of measuring fluctuations in the indicated mean effective pressure of an engine and apparatus therefor, and particularly to such a method which is suitable for measuring the combustion stability (cycle work stability) of each cylinder in a multi-cylinder engine for a motor car.

2. Description of the Prior Art

In recent years, necessity has been voiced for improving the fuel consumption rate in engines in motor cars because of the foreseeable exhaustion of energy resources. For this reason, measures have been developed for improving combustion, decreasing friction and so forth, and some of these measures have been put to practical use. For example, setting the idling rotational speed of an engine at a low level has been tried. However, lowering the idling speed tends to increase engine vibrations, causing uncomfortable vibrations and generating increased noise in the transmission and the like. Consequently, it follows that for reduced idling speeds will be problem free, the stability of the engine must be improved, i.e., the fluctuations in the cycle work must be reduced.

Nevertheless, heretofore, in order to measure the fluctuations of the indicated mean effective pressure Pi of a multi-cylinder engine, representing the combustion stability per cylinder of the engine, i.e., the stability of the power generated for each cycle, not only have pressure indicators been mounted on the respective cylinders (because the indicated mean effective pressure Pi has been obtained from an indicator diagram) but also a high-speed data processor has been employed which has a large memory capacity for statistically processing multi-cycle indicator diagrams. For this reason, the manufacturing cost for the measuring apparatus has been very high, handling the measuring apparatus has been troublesome, and it has been difficult to make measurements of fluctuations in the indicated mean effective pressure in a simple way.

Also, devices for macroscopically evaluating the idling stability, including devices for measuring changes in the mean rotational speed, engine vibration width and vibration acceleration, for example, have been used. However, all of these data are dependent upon many factors in addition to variations in rotational speed due to variations in combustion. Furthermore, only superficial data, which have undergone interference of an engine mount, etc., can be obtained, thus presenting disadvantages that the measured values have low physical significance, and moreover, measurements for the respective cylinders cannot be effected.

SUMMARY OF THE INVENTION

The present invention has been developed to obviate the disadvantages of the prior art and has as its object the provision of a method for obtaining an indication of fluctuations of the indicated mean effective pressure in an engine and an apparatus therefor, wherein mere mounting of a small-size rotational sensor at the forward end of a crankshaft of the engine makes it possible to readily measure the stability of the respective cylinders (related to fluctuations of the indicated mean effective pressure).

According to the present invention, changes in the rotational speed of the engine are detected. A deviation of the mean pressure is calculated from this change in the rotational speed. Then a high interrelation between the deviation of the mean pressure and the deviation of the indicated mean effective pressure or between the unbiased variances of the former and the latter is utilized to obtain the fluctuations in the indicated mean effective pressure. As a result, the object of this invention may be achieved.

According to an aspect of the present invention, a number of pulse signals generated per unit engine crankshaft angle is detected by a crank angle sensor. Time intervals, each of which corresponds to the number of pulse signals thus obtained, are alternately counted by counters. Changes in the rotational speed of the engine are calculated based on outputs of the counters, and a deviation of the mean pressure is calculated from the changes in the rotational speed of the engine. A high correlation between the deviation of the mean pressure and the deviation of the indicated mean effective pressure or between the unbiased variances of the former and the latter are utilized to obtain the fluctuations in the indicated mean effective pressure.

Thus, the present invention does not require pressure indicators to be mounted on the respective cylinders and a high-speed data processor having a large capacity of memory. Instead, all that is required is a small-size rotational sensor mounted at the forward end of a crankshaft of an engine. Consequently, it is possible, with the present invention, to discriminate between satisfactory and unsatisfactory combustions in the respective cylinders, so that improved idling stability can be achieved. Also, an improved fuel consumption rate can be obtained through the low idling rotational speed.

BRIEF DESCRIPTION OF THE DRAWINGS

The abovementioned features and object of the present invention will become more apparent by reference to the following description taken in conjunction with the accompanying drawings, wherein like reference numerals denote like elements, and in which:

FIG. 3 is a block diagram showing an engine provided therein with a measuring apparatus for the method of measuring fluctuations of the indicated mean effective pressure of an engine, embodying the present invention;

FIG. 4 is a longitudinal sectional view showing the arrangement of the crank angle sensor used in the abovedescribed embodiment;

FIG. 5 is a front view showing a portion of the disk of the crank angle sensor;

DETAILED DESCRIPTION OF THE INVENTION

Figure 1:
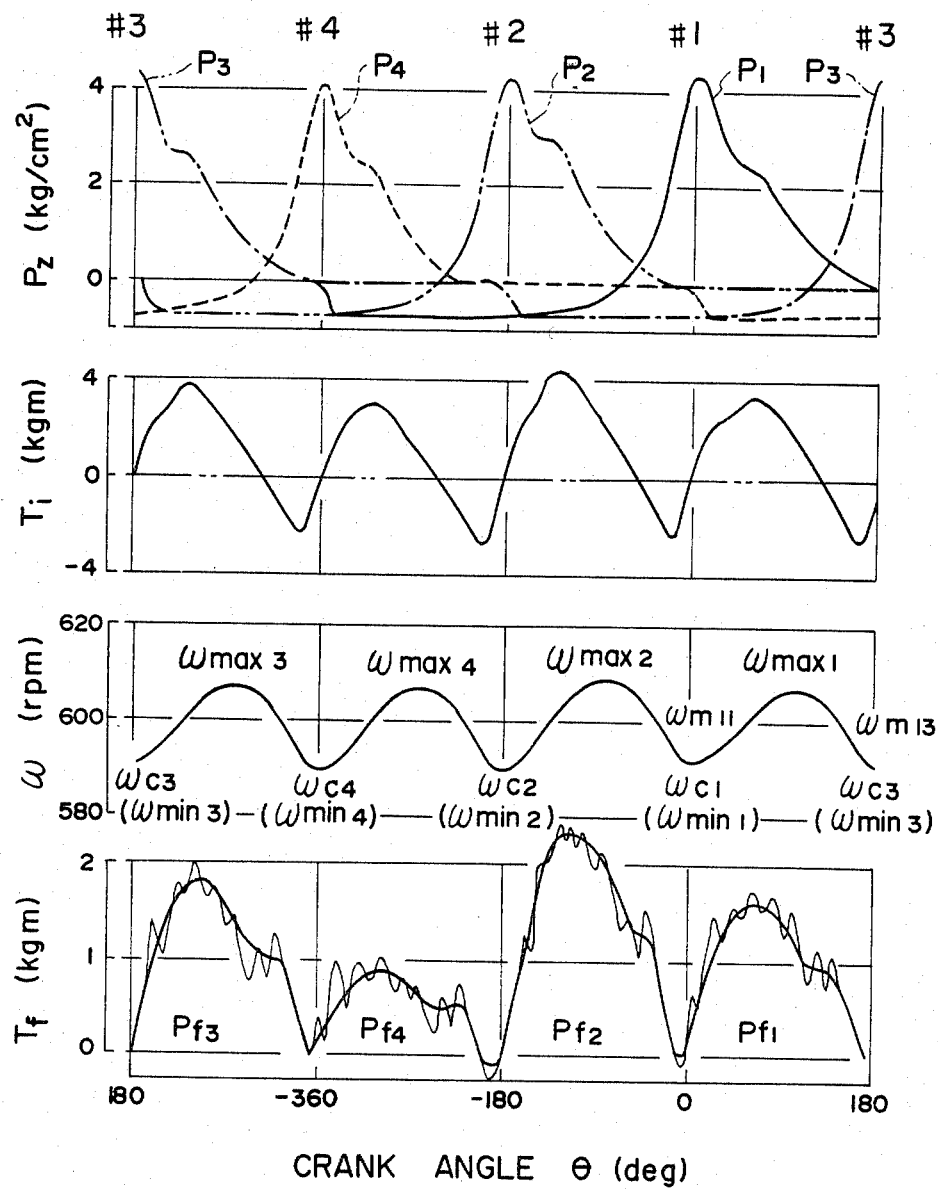
FIG. 1 includes diagrams showing the internal pressures of cylinders against the changes in crank angle, the indicated torque against the changes in crank angle, the engine rotational speed against the changes in crank angle and the frictional torque against the changes in crank angle in an engine of in-line four cylinder, four cycle and even firing engine.

Description will hereunder be given of the principle of the present invention. Firstly, study will be made of equations relating to the indicated mean effective pressure in an in-line four cylinder, four cycle, regular internal combustion engine. FIG. 1 is a chart showing changes in the internal pressure $P_z$ of the respective cylinders (z indicates cylinder No.), changes in the indicated torque, changes in the rotational speed $\omega$ of the engine and changes in the frictional torque $T_f$ with respect to the respective crank angles $\theta$ in the engine. The firing order in this engine is #3, #4, #2 and #1, and the engine operating conditions include a mean rotational speed of 600 rpm, mean air-fuel ratio of 13 and ignition timing of 5° BTC.

Here, the frictional torque $T_f$ has been obtained in the following manner. Assuming that the crankshaft is a rigid body, the following correlation exists between an inertia force of the engine and an indicated torque $T_i$.

$$I \frac{d \cdot \omega}{dt} = T_i - T_e - T_f \quad (1)$$

where I is a moment of inertia of the engine and $T_e$ brake torque.

The indicated torque $T_i$ of a multicylinder engine can be calculated from the cylinder pressure $P_z$ and the reciprocatory inertia force which is applied to the pistons of the respective cylinders as shown in the following equation.

$$T_i = \sum_{z=1}^{m} \left( P_z - \frac{1}{A^2} \frac{w}{g} \frac{d^2 V_z}{dt^2} \right) \frac{dV_z}{d\theta} \quad (2)$$

where m is the number of cylinders, A a cross sectional area of the piston, g a gravitational force acceleration and $V_z$ a volume of a z-numbered cylinder.

The frictional torque $T_f$ can be obtained from the equations (1) and (2) and will be represented by the following equation.

$$T_f = \sum_{z=1}^{m} \left( P_z - \frac{1}{A^2} \frac{w}{g} \left( \omega^2 \frac{d^2 V_z}{d\theta^2} + \omega \frac{d\omega dV_z}{d\theta d\theta} \right) \right) \frac{dV_z}{d\theta} - T_e - I_\omega \frac{d\omega}{d\theta} \quad (3)$$

A brake torque $T_e$ can be regarded as a constant value under a steady state running condition of the vehicle and a constant current control in a DC dynamometer, and hence, is easily obtainable from a value indicated in a DC dynamometer, for example.

Consequently, if the pressures $P_1 \sim P_m$ of all of the cylinders and the rotational speeds $\omega$ against the respective crank angles $\theta$ sequentially are measured in the right side of the equation (3), the frictional torque can be calculated. Thus, the frictional torque $T_f$ shown in FIG. 1 has been obtained.

Now, the maximum rotational speed $\omega_{max}$ and the rotational speed at the top dead center of compression stroke $\omega_c$ are made to correspond to the cylinder number of the expansion stroke as shown in FIG. 1, respectively, and the maximum rotational speed $\omega_{max1}$, and the rotational speed at the top dead center of compression stroke $\omega_{c1}$ are obtained for example. In a four cylinder engine, this rotational speed at the top dead center of $\omega_c$ compression stroke is almost identical in value with the minimum rotational speed $\omega_{min}$. Additionally, the stroke mean rotational speed $\omega_m$ and the speed change ratio D are made to correspond to the maximum rotational speed and the rotational speed at the top dead center of compression stroke, respectively, in the case of $\omega_{max1}$ and $\omega_{c3}$, the following equations will be obtained.

$$\omega_{m13} \equiv (\omega_{max1} + \omega_{c3})/2 \quad (4)$$

$$D_{13} \equiv (\omega_{max1} - \omega_{c3})/\omega_{m13} \quad (5)$$

Here, if both sides of the equation (1) are integrated from $\theta = 0°$ to $\theta_{\omega max1}$, directing attention to the expansion stroke ($\theta = 0 \sim 180°$) of No. 1 cylinder, and $D_{11}$ is sought, then the following equation will be obtained ($\theta$ is the crank angle).

$$D_{11} = \frac{1}{I\omega^2 m 11} \int_{0°}^{\theta_{\omega max1}} (T_i - T_e - T_f) d\theta \quad (6)$$

Likewise, if both sides of the equation (1) are integrated from $\theta = \theta_{\omega max1}$ to 180°, and $D_{13}$ is sought, then the following equation will be obtained ($\theta$ is the crank angle).

$$-D_{13} = \frac{1}{I\omega^2 m 13} \int_{\theta_{\omega max1}}^{180°} (T_i - T_e - T_f) d\theta \quad (7)$$

The following equation results from the abovementioned equations (6) and (7).

$$\int_{0°}^{180°} (T_i - T_e - T_f) d\theta = I(D_{11}\omega^2 m 11 - D_{13}\omega^2 m 13) \quad (8)$$

Here, the following symbols will be defined.

$$P_{\omega 1} \equiv (D_{11} \cdot \omega^2_{m11} - D_{13} \cdot \omega^2_{m13})I/V_h \quad (9)$$

: the mean pressure obtained from changes in speed in expansion strokes of No.1 cylinder, $$P_{e1} \equiv \int_{0°}^{180°} T_e d\theta / V_h \quad (18)$$

: the brake mean effective pressure in expansion stroke of No.1 cylinder, $$P_{f1} \equiv \int_{0°}^{180°} T_f d\theta / V_h \quad (10)$$

: the friction mean pressure in expansion stroke of No.1 cylinder,
Wez: the work in expansion stroke of No. z cylinder,
Wxz: the work in exhaust strokes of No. z cylinder,
Wcz: the work in compression strokes of No. z cylinder,
Wsz: the work in intake stroke of No. z cylinder,
$\delta Wx_2 \equiv Wx_2 - Wx_1$: the difference in work of expansion stroke between No. 1 and No. 2 cylinders,
$\delta Wc_3 \equiv Wc_3 - Wc_1$: the difference in work of compression stroke between No. 1 and No. 3 cylinders,
$\delta Ws_4 \equiv Ws_4 = Ws_1$: the difference in work of intake stroke between No. 1 and No. 4 cylinders.

If both sides of the abovementioned equation (2) are integrated from $\theta = 0° \sim 180°$, then the sum of the integrated values of the reciprocating forces in all the four cylinders comes to be zero ($\theta$ is the crank angle). Further, if both sides are divided by the stroke volume $V_h$, then the following equation will be obtained.

$$\int_{0°}^{180°} Ti d\theta/V_h = \sum_{z=1}^{4} \int_{0°}^{180°} P_z dV_z / V_h \quad (11)$$
$$= (We1 + Wx2 + Wc3 + Ws4)/V_h$$
$$= Pi1 + (\delta Wx2 + \delta Wc3 + \delta Ws4)/V_h$$

If both sides of the abovementioned equation (8) are divided by the stroke volume $V_h$ and the equation (11) and the defined symbols are substituted, then the following equation will be obtained.

$$Pi1 + (\delta Wx2 + \delta Wc3 + \delta Ws4)/V_h - Pe1 - Pf1 = P_{\omega}1 \quad (12)$$

Here, the fluctuation per cycle is taken into consideration. Only the work We1 in expansion stroke of No. 1 cylinder contributes to the fluctuations of the indicated mean effective pressure $P_i$, and the friction mean pressure Pf1, the work Wx2 of exhaust stroke of No. 2 cylinder, the work Wc3 of compression stroke of No. 3 cylinder and the work Ws4 of intake stroke of No. 4 cylinder are all very low in fluctuations, and, if assumption is made that these fluctuations may be disregarded, then $\delta Wx2$, $\delta Wc3$ and $\delta Ws4$ can be regarded as constants. Further, the brake torque Te can be regarded as a constant value in the steady state running condition of the vehicle and in the constant current control by a DC dynamometer as described above, the relationship as shown in the following equation will be approximately established.

$$Pi1 - \overline{Pi1} = P_{\omega}1 - \overline{P_{\omega}1} \quad (13)$$

Namely, the deviation of the indicated mean effective pressure Pi1 per cycle becomes identical with the deviation of the mean pressure $P_{\omega}1$ obtained from the change in rotational speed. Further, since the unbiased variance (mean square) $V_{pi1}$ of the indicated mean effective pressure Pi1 can be represented by the unbiased variance (mean square) $V_{p\omega}1$ of the mean pressure $P_{\omega}1$, the relationship of the following equation will be established.

$$V_{pi1} = V_{p\omega}1 \quad (14)$$

This equation (14) can be applied to No. 2, No. 3 and No. 4 cylinders for calculation, and hence, in an engine of in-line four cylinder, four cycle and regular internal combustion, the following equation will be established in general.

$$V_{piz} = V_{p\omega z} \quad (15)$$

Figure 2:
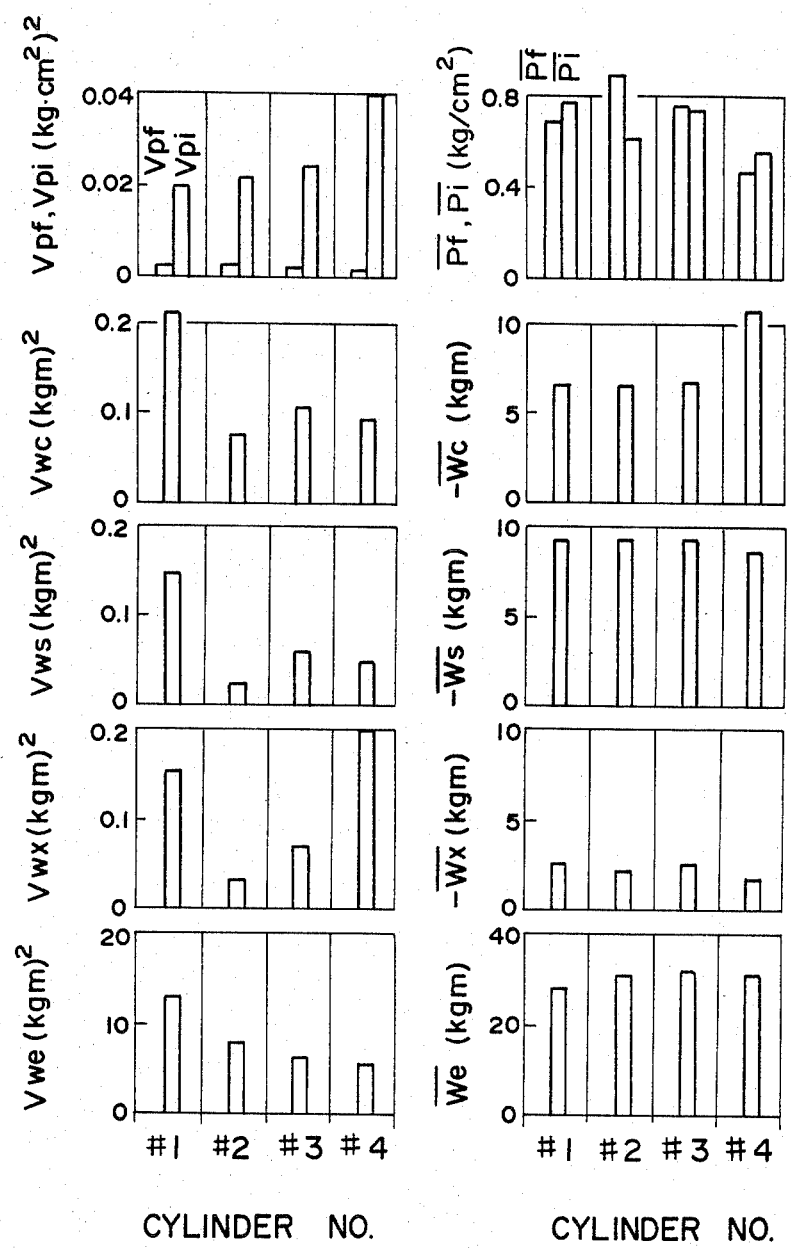
FIG. 2 includes diagrams showing the correlation between the mean values of the respective power generated for each cycle and the unbiased variances (mean) square.

Next, the abovedescribed assumption will be studied. The unbiased variance (mean square) $V_{pf}$ of the friction mean pressure Pf of the cylinders, as shown in FIG. 2, is as small as 2 to 10% of the unbiased variance (mean square) $V_{pi}$ of the indicated mean effective pressure Pi. Additionally, the unbiased variances (mean square) Vwx, Vws and Vwc of the respective works of exhaust, intake and compression Wx, Ws and Wc are also as small as 0.3 to 3% of the unbiased variance (mean square) Vwe of the work of expansion strokes We. Consequently, in the abovementioned equation (12) if assumption is made that Pf1, $\delta Wx2$, $\delta Wc3$ and $\delta Ws4$ are constants, the resultant errors will be small.

On the other hand, the differences in the mean value $\overline{Pi}$ of the indicated mean effective pressure Pi and in the mean value $\overline{Pf}$ of the friction mean pressure Pf during expansion stroke between the respective cylinders are as large as 32% and 65%, respectively. Further, since the differences in the mean values of the works of the respective strokes between the respective cylinders are large, it is difficult to calculate the absolute value of the indicated mean effective pressure Pi from the abovementioned equation (12). However, if the mean value is discriminated from the fluctuations, then the difference of the indicated mean effective value Pi can be calculated.

The equations relating to the indicated mean effective pressure in an engine of m cylinder and regular internal combustion will now be explained. In the engine of m cylinder and regular internal combustion, if assumption is made that the ignition order is z1, z2 ... zm and the ignition internal is $\Delta\theta$ ($= 720°/m$ in four cycles and $360°/m$ in two cycles), then the abovementioned equations (6) and (7) will result in the following equations.

$$Dz1z1 = \frac{1}{I\omega^2_{mz1z1}} \int_0^{\theta_{\omega max z1}} (Ti - Te - Tf) d\theta \quad (6)'$$

$$-Dz1z2 = \frac{1}{I\omega^2_{mz1z2}} \int_{\theta_{\omega max z1}}^{\Delta\theta} (Ti - Te - Tf) d\theta \quad (7)'$$

where $$P_{\omega z1} \equiv I/V_h(Dz1z1\omega^2_{mz1z1} - Dz1z2\omega^2_{mz1z2}) \quad (9)'$$

$$Pez1 = \int_{0°}^{\Delta\theta} Te\, d\theta/V_h \tag{18}'$$

$$Pfz1 = \int_{0°}^{\Delta\theta} Tf\, d\theta/V_h \tag{10}'$$

$$Wkz \equiv \int_{(k-1)\Delta\theta}^{k\cdot\Delta\theta} PzdVz\ (k=1,2\ldots m) \tag{15}$$

$$\delta Wkz \equiv Wkz - Wkz1 \tag{16}$$

Then, the abovementioned equation (12) will be represented by the following equation.

$$Pi1 + \sum_{k=1}^{m} \delta\omega kz/V_h - Pe1 - Pf1 = P\omega 1 \tag{12}'$$

If assumption is made that Pf1 and δWkz have small fluctuations per cycle which can be neglected, then the equation (12) becomes identical with the equation (13), and, after all, the equation (15) can be established with the engines of regular internal combustion in general.

The present invention has been developed on the knowledge as described above.

Description will be given of an embodiment of an apparatus for measuring fluctuations in the indicated mean effective pressure of an engine, to which the present invention is applied. As shown in FIG. 3, this embodiment comprises: a crank angle sensor 12 provided at the forward end of a crankshaft 10a of an engine 10 (an engine of in-line four cycles and four cylinders for example); two counters 14 and 16 for alternately counting time intervals, each of which corresponds to the number of pulse signals (100 pulses for example) corresponding to a given crank angle (10° for example) in accordance with an output from this crank angle sensor 12 and outputting a signal of the result; a calculating device 18 for calculating a deviation in mean pressure from changes in the rotational speed of the engine derived from outputs from the counters 14 and 16, and for calculating fluctuations in the indicated mean effective pressure based on the close correlation between a deviation in mean pressure and a deviation in the indicated mean effective pressure, or between the unbiased variances (mean squares) of the indicated mean effective pressure and the mean pressure and a printer 20 for printing outputs from the calculating device 18.

As shown in detail in FIGS. 4 and 5, the aforesaid crank angle sensor 12 comprises: a disk 22 solidly secured to the crankshaft 10a of the engine 10 and provided in the vicinity of the outer periphery thereof with 3600 slits 22a for detecting a crank angle (at an interval of 0.1°) and a slit 22b for detecting the top dead center; two pairs of emission diodes 24a and photodiodes 26a vertically, fixedly provided in a manner to interpose the disk 22 for detecting the passage of the slit 22a which detects a crank angle; and two pairs of emission diodes 24b and photodiodes 26b also vertically, fixedly provided in a manner to interpose the disk 22 for detecting the passage of the slit 22b which detects the upper dead center. Provided at the forward ends of the light receiving portions of the respective photodiodes 26a and 26b are slit plates 28a and 28b provided therein with slits identical in shape with ones formed in the disk 22, and fringes formed by the slit plates and the disk are detected by the photodiodes 26a and 26b. Here, the provision of the additional pair of photodiodes 26a and 26b at symmetrical positions to the pair of photodiodes 26a and 26b makes it possible to have signals issued from both pairs of photodiodes composed to compensate errors in pulse interval caused by errors in squareness between the slits and the rotary shaft.

This crank angle sensor 12 has about $10^{-4}$ of the friction torque of that of the engine and about $10^{-5}$ of the inertia moment of that of the engine in order to prevent changes in the performance of the engine. In addition, the signals per 0.1° corresponding to the crank angle are issued at as high as approx. 60 KHz at 1000 rpm, and hence, tend to be subjected to electrical noise. Consequently, an amplifier is provided in the crank angle sensor 12, whereby an output impedance is made satisfactorily low, so that the signals cannot be easily subjected to the influence of the noises.

Figure 6:
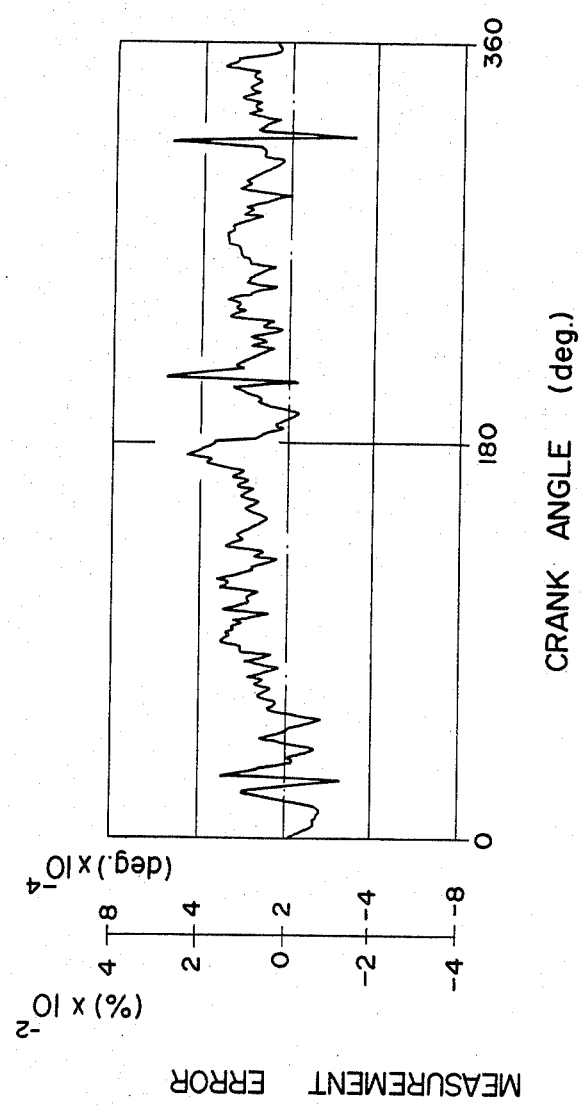
FIG. 6 is a chart showing the results of accuracy inspection of the crank angle sensor.

FIG. 6 shows the results of the accuracy detection obtained by the process in which a flywheel (of about 0.1 kg/cm/sec²) was mounted which had a satisfactorily large inertia moment as compared with the friction torque of the crank angle sensor 12 and the disk 22 was run idle. The measuring of a section of 2° at a flywheel speed of 200 rpm, which corresponds to the measuring of a section of 10° at the engine rotational speed of 1000 rpm, was carried out. When assumption was made that the deceleration per rotation is constant and the error in measuring of the crank angle sensor 12 were calculated, the error in measuring was $6 \times 10^{-4}$ deg (the accuracy against 2° was 0.03%), indicating that the desired accuracy can be obtained.

Figure 7:
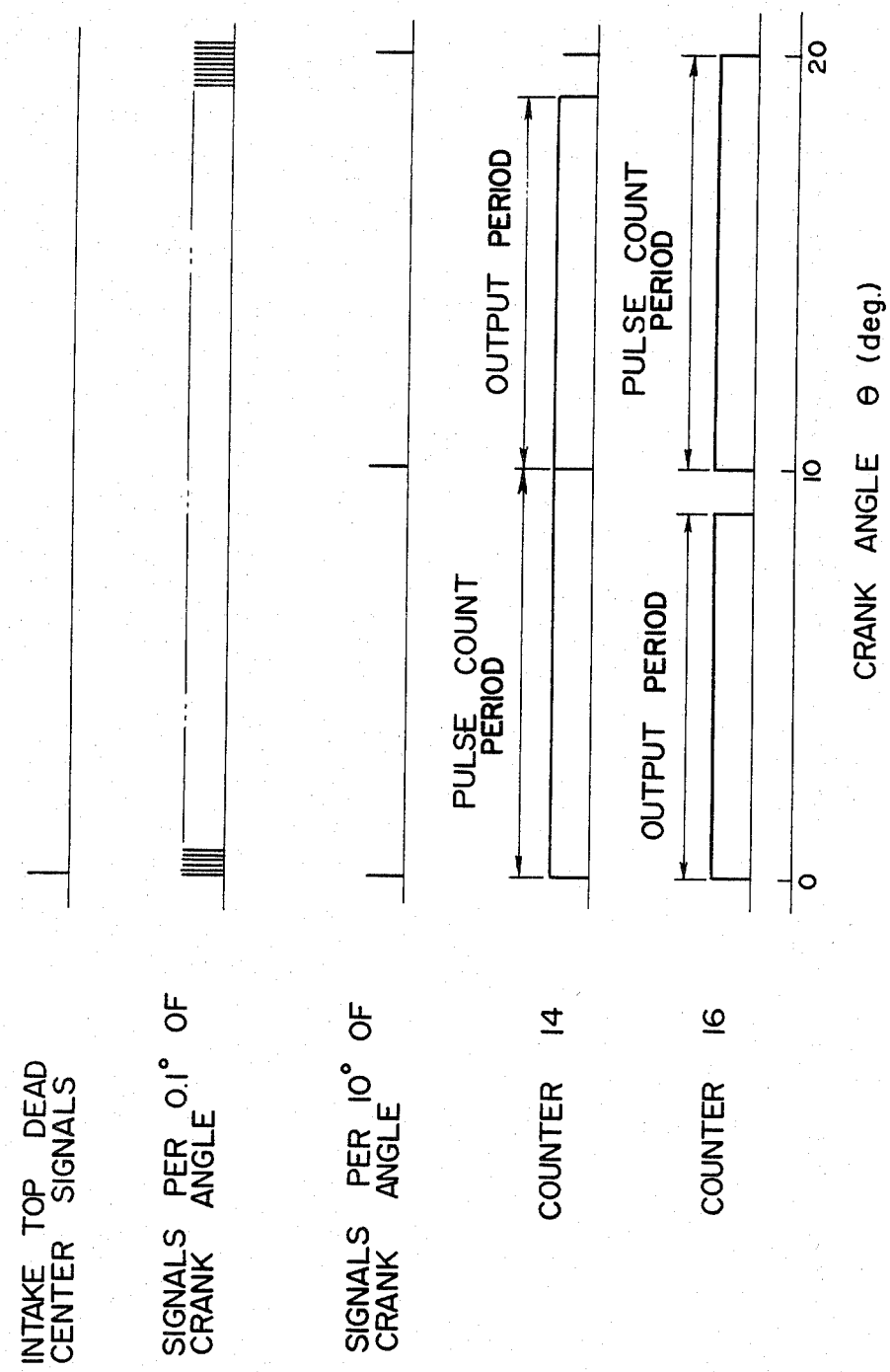
FIG. 7 is a chart showing the signals issued from the respective portions of the abovedescribed embodiment.

Description will now be given of the manner in which the preferred embodiment operates. As shown in FIG. 7, to determine the rotational speed ω of the engine, measurement is started from a signal indicating the top dead center of the intake stroke. The two counters 14 and 16 each include an internal oscillator 14a and 16a, respectively, and alternately count the number of pulses from oscillators 14a and 16a, respectively, which represents the time interval during 100 pulse signals from angle sensor 12, each of which is issued at a crank angle of 0.1°, i.e., the number of pulses from oscillators 14a and 16a, respectively, corresponding to a crank signal of 10° and output the counted value to the calculating device 18, so that a time period inversely related to the rotational speed ω of the engine for a section of 10° of the crank angle can be continuously outputted to the calculating device 18. Oscillators 14a and 16a are crystal oscillators having a frequency of 50 MHz and are used for counting the time interval for a section of 10° made by the counters 14 and 16. With this arrangement, a resolving-power of about $10^{-4}$ deg can be obtained at the engine rotational speed of 1000 rpm. The reason why the section of 10° is counted by 100 pulse signals, each of which corresponds to 0.1°, is that, when the output levels of the photodiodes 26a and 26b fluctuate, trigger points at the time of wave shaping also fluctuate, which result in an error in counting the time interval, however, this error is inversely proportional to the number of pulses for the counting section, so that the frequency dividing by as many pulses as possible upon completion of detection can minimize the error.

The output signals of counters 14 and 16 in FIG. 7 clearly show that counters 14 and 16 are double buffered. That is, counter 14 is counting while counter 16 is outputting data, and vice versa, so that the time interval for every 10° of rotation can be measured. Those skilled in the art will readily appreciate that double buffering is typically accomplished by a controller, such as controller 17, which applies a signal to counter 16 during counting periods and no signal to counter 16 during output periods. Inverter 17a typically applies the inverse of this signal to counter 14. Therefore, calculating device 18 receives alternately from counters 14 and 16 the time periods required for consecutive 10° of rotation which it can then simply convert to rotational speed.

Figure 8:
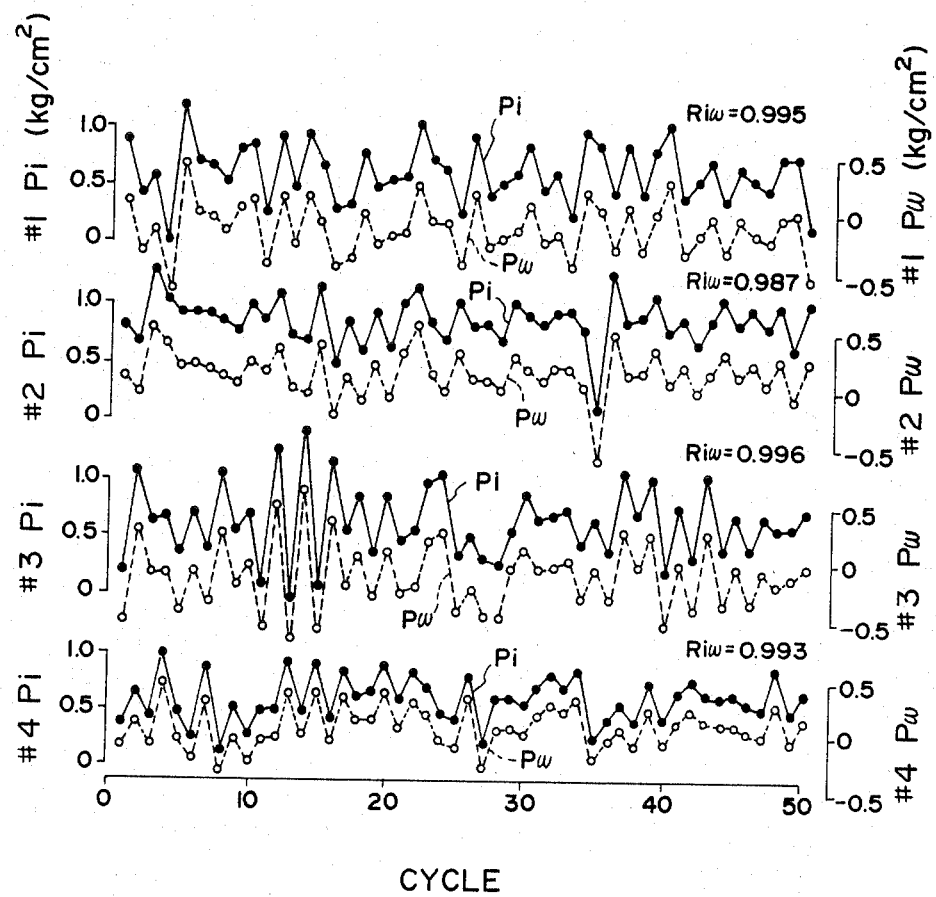
FIG. 8 is a chart showing the correlation between the mean pressures calculated from the changes in the rotational speed and the indicated mean effective pressures calculated from the indicated diagrams in the same manner as in the prior art.

FIG. 8 shows in time sequence the relationship between changes (broken lines) in the mean pressure $P\omega$ calculated from the speed change ratio by use of the abovedescribed embodiment and changes (solid lines) in the indicated mean effective pressure Pi calculated from the indicated pressure diagrams as in the conventional manner. For these tests, the mean rotational speed was 600 rpm, the engine had no-load, the mean air-fuel ratio was 15 and the ignition timing was 5° BTC. As is apparent from FIG. 8, the indicated mean effective pressure Pi and the mean pressure $P\omega$ are different in mean value from each other, however, satisfactorily identical in deviation with each other. The coefficient of correlation $Ri\omega$ therebetween is 0.987 to 0.996 which is as high as approximating to 1. Consequently, the abovementioned equation (13) is established with a considerably high accuracy, and the deviation of the mean pressure $P\omega$ calculated by the calculation device 18 can be regarded as the deviation of the indicated mean effective pressure Pi.

Figure 9:
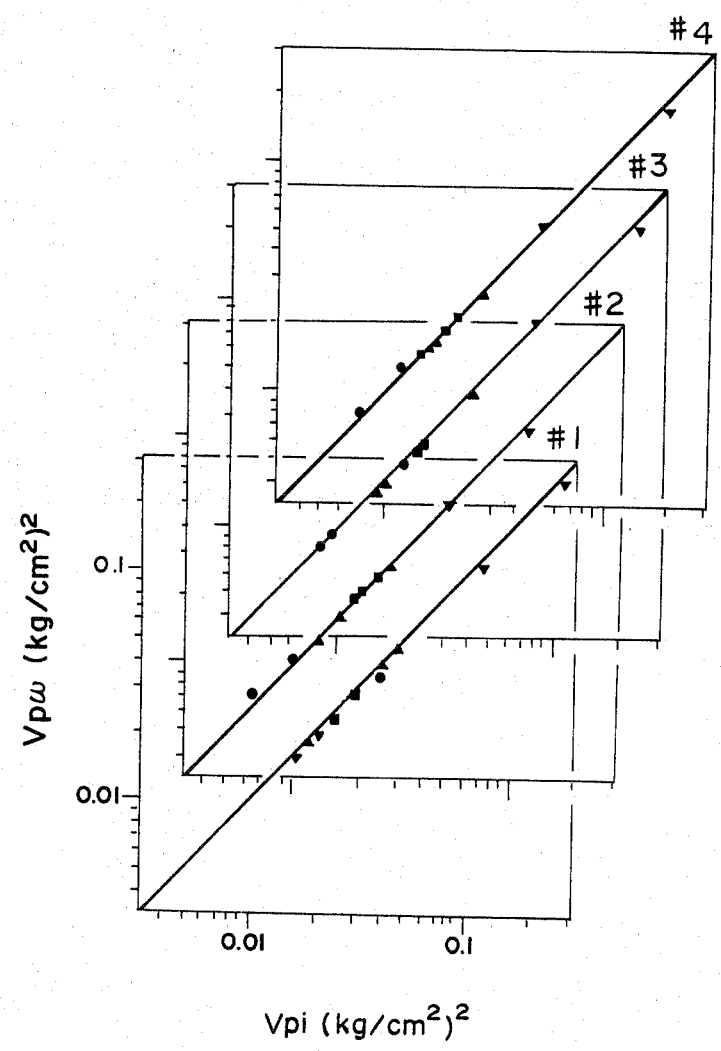
FIG. 9 is a chart showing the correlation between the mean pressures and the unbiased variances of the indicated mean effective pressures in a four cylinder engine.
Figure 12:
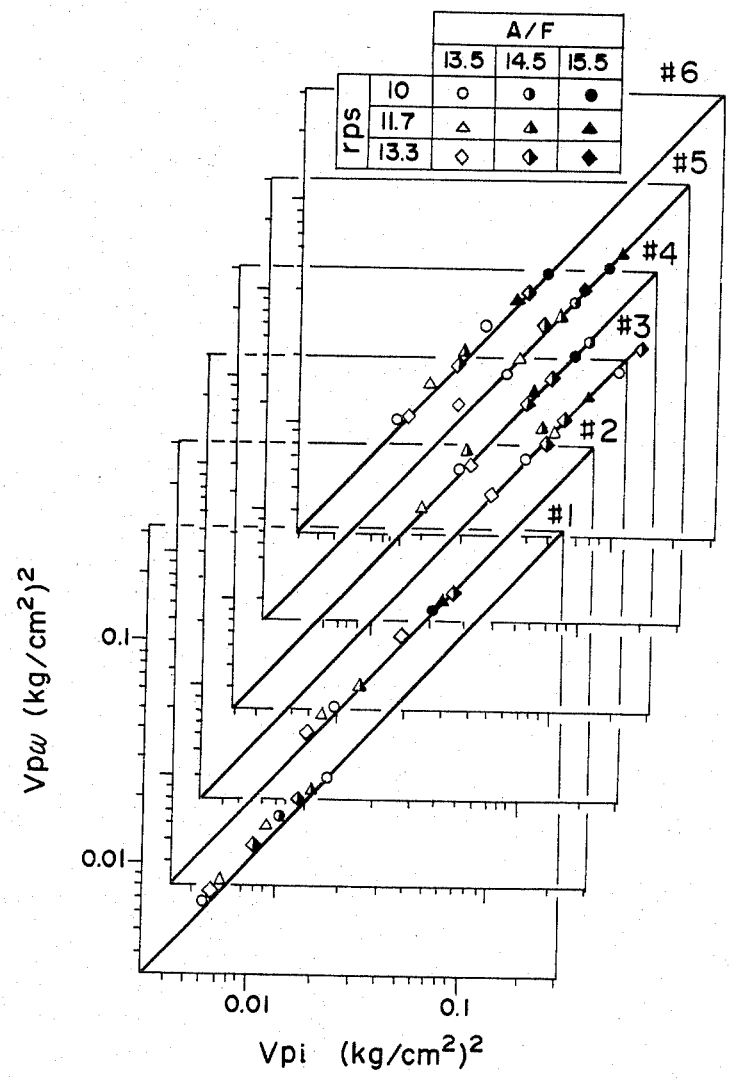
FIG. 12 is a chart showing the correlation between the mean pressures and the unbiased variances of the indicated mean effective pressures in a six cylinder engine.

FIG. 9 shows the correlations between the unbiased variance (mean square) Vpi of the indicated mean effective pressure Pi and the unbiased variance (mean square) $Vp\omega$ of the mean pressure $P\omega$. In the drawing, marks ▲ show the case of the lubricant oil temperature being changed, marks ● the case of the mean rotational speed of the engine being changed, marks ■ the case of the ignition timing being changed, and marks ▼ the case of the mean air-fuel ratio being changed. As apparent from FIG. 9, the unbiased variance Vpi of the indicated mean effective pressure Pi and the unbiased variance (mean square) $Vp\omega$ of the mean pressure $P\omega$ are satisfactorily identical with each other in all of the cylinders and it has been ascertained that the abovementioned equation (15) can be established. FIG. 12 shows the results of the abovedescribed experiments conducted with a six-cylinder engine. It has been ascertained that the equation (15) can be established not only with a four cylinder engine but also with a six cylinder engine.

Figure 10:
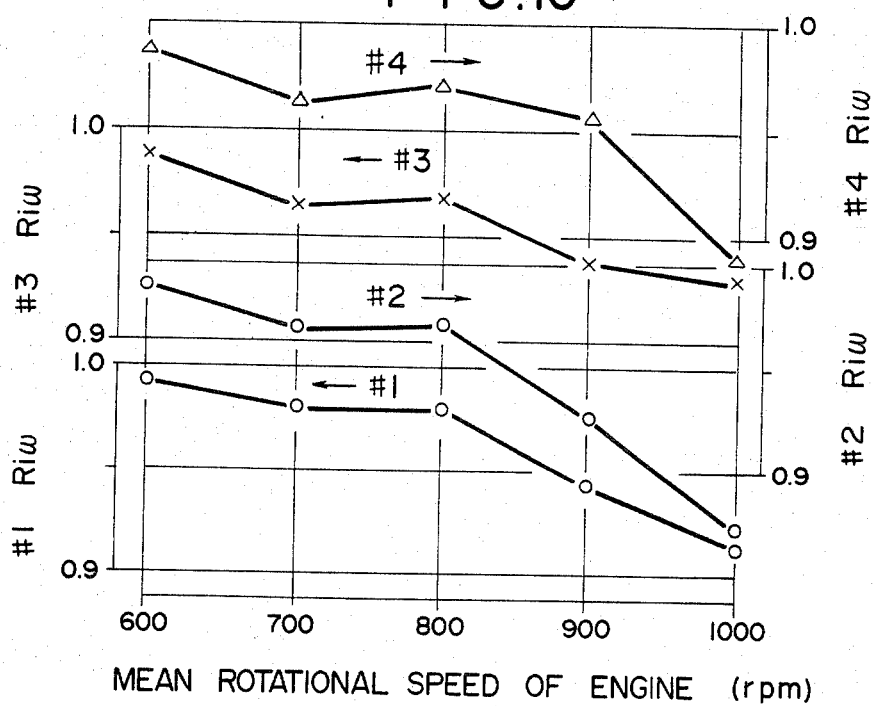
FIG. 10 is a chart showing the changes in the correlation coefficient between the indicated mean effective pressure and the mean pressure when the mean rotational speed of the engine is changed.

FIG. 10 shows the coefficient of correlation $Ri\omega$ between the indicated mean effective pressure Pi and the mean pressure $P\omega$ when the mean rotational speed of the engine is changed. The larger the rotational speeds become, the smaller the coefficients of correlation become. This is attributed to the facts that, as shown in the abovementioned equation (6), the speed change ratio D is reduced in inverse proportion to square of the mean rotational speed $\omega_m$, the period of time for which the crank angle sensor 12 counts the section of 10° is decreased to deteriorate the resolving-power of the clock, and the vibration of the engine make the error of the disk 22 increased. However, the coefficient is 0.95 or more at the engine rotational speed 850 rpm, and in general, the reference engine rotational speed of idling of the motor car engines are 850 rpm in most cases and there is a tendency of ever-lowering setting of the reference engine rotational speed of idling due to the required low fuel consumption rate in recent years, and the lower the rotational speed becomes, the more the stability in idling is required. As viewed from the abovementioned requirements, this is a satisfactory accuracy in practical use.

Figure 11:
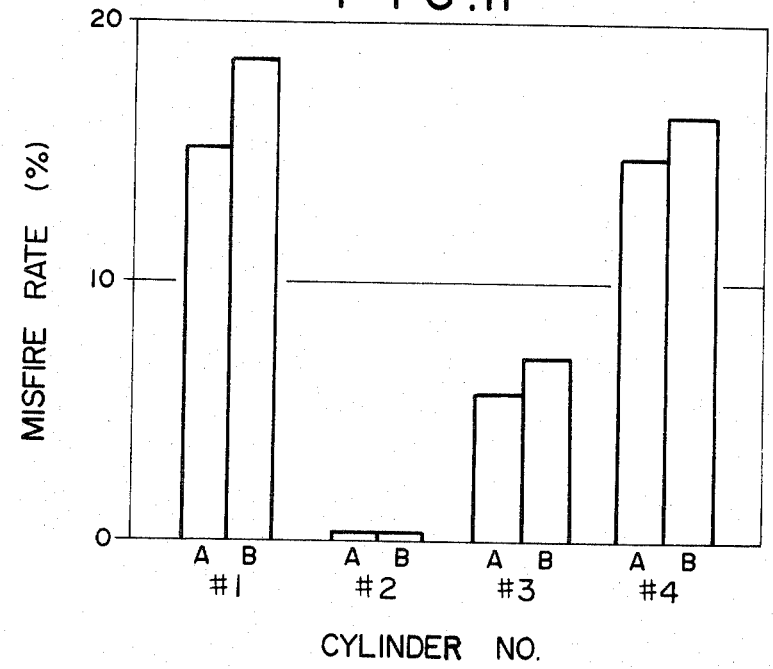
FIG. 11 is a chart showing the comparison of the misfire rates calculated from both the indicated mean effective pressure and the mean pressure.

FIG. 11 shows comparisons between a misfire rate A which has been sought in such a manner that a cycle, in which the indicated mean effective pressure Pi becomes a negative value, is regarded as a cycle of misfire, and a misfire rate B calculated from a cycle, in which $P\omega + \overline{Pi}$ becomes a negative value. The operating conditions of the engine include the mean rotational speed of the engine of 600 rpm, the mean air-fuel ratio of 16 and the ignition timing of 5° BTC. As apparent from the drawing, both misfire rates are satisfactorily identical with each other.

In the abovedescribed embodiment, the mean pressure of No. 1 cylinder has been calculated from a change in speed from the top dead center in the expansion stroke of No. 1 cylinder to the maximum speed by use of the abovementioned equation (9). However, since the abovementioned equation (9) can be represented by the following equation, it is possible to calculate the mean pressure $P\omega 1$ from the result of measuring only the rotational speed $\omega c$ at the top dead center of the compression stroke.

$$P\omega 1 = (\omega^2_{c3} - \omega^2_{c1})I/2Vh \qquad (17)$$

In this case, it should be sufficient only if the rotational speed at the top dead center of a predetermined cylinder and the rotational speed at the upper dead center of the succeeding cylinder are measured, thus eliminating the necessity of the measured values at every crank angles.

In the abovedescribed embodiment, the present invention is applied to an engine of in-line four cylinder, four cycle and regular internal combustion. It should be understood, that there is no intention to limit the invention to the specific forms disclosed, but on the contrary, the invention can be likewise applied to the multiple-cylinder engines of regular interval combustion and/or the single-cylinder engines in general.

From the foregoing description it should be apparent to one skilled in the art that the abovedescribed embodiment is but one of many possible specific embodiments which can represent the applications of the principles of the present invention. Numerous and varied other arrangements can be readily devised by those skilled in the art without departing from the spirit and scope of the invention.

What is claimed is:

1. A method of determining a deviation in an indicated mean effective pressure of an engine comprising the steps of:
   (a) detecting crankshaft rotational speeds at a plurality of crankshaft angles and generating speed signals related thereto;
   (b) determining a plurality of times a mean pressure for a selected cylinder based on said speed signals;
   (c) electronically determining a deviation of an indicated mean effective pressure for said selected cylinder in accordance with a difference between said mean pressure and an average of said plurality of mean pressure determinations; and
   (d) outputting an indication of said deviation of an indicated mean effective pressure for said selected cylinder.

2. Method of determining a deviation in an indicated mean effective pressure of an engine comprising the steps of:

(a) detecting top dead centers of a No. i cylinder and a No. i+1 cylinder of said engine, said No. i+1 cylinder being the next cylinder in said engine to reach top dead center after said No. i cylinder;

(b) detecting rotational speeds $\omega_{ci}$ and $\omega_{c(i+1)}$ of a crankshaft at said top dead centers of said No. i cylinder and said No. i+1 cylinder, respectively;

(c) determining a mean pressure P$\omega$i of said No. i cylinder in response to said detecting step (b) in accordance with the following formula:

$$P\omega i = (\omega^2_{c(i+1)} - \omega^2_{ci})I/2Vh$$

where: I is a moment of inertia and Vh is a volume of the cylinder;

(d) calculating a mean value $\overline{P\omega i}$ of a mean pressure P$\omega$i on the basis of a plurality of said mean pressures P$\omega$i;

(e) determining a deviation $\Delta$Pii of an indicated mean effective pressure Pii of said No. i cylinder from a subtractive result of (P$\omega$i $- \overline{P\omega i}$); and (f) outputting an indication of said deviation of the indicated mean effective pressure Pii of said No. i cylinder to an output device.

3. Method of determining a deviation in an indicated mean effective pressure of an engine comprising the steps of:

(a) detecting a top dead center of each of a plurality of cylinders in said engine;

(b) detecting a rotational speed of a crankshaft at every predetermined crank angle;

(c) determining a minimum rotational speed $\omega_{ci}$ of said crankshaft at around the top dead center of a No. i cylinder during a compression stroke;

(d) determining a maximum rotational speed $\omega_{maxi}$ of said crankshaft during an expansion stroke of said No. i cylinder;

(e) calculating a mean rotational speed $\omega_{mii}$ during said expansion stroke of said No. i cylinder on the basis of a formula of $$\left(\frac{\omega_{ci} + \omega_{maxi}}{2}\right);$$

(f) calculating a ratio Dii of change in rotational speed during said expansion stroke of said No. i cylinder on the basis of a formula of $((\omega_{maxi} - \omega_{ci})/\omega_{mii})$;

(g) determining a minimum rotational speed $\omega_{c(i+1)}$ of said crankshaft at around the top dead center of a No. (i+1) cylinder during a compression stroke, said No. (i+1) cylinder being the next cylinder in said engine to reach top dead center after said No. i cylinder;

(h) calculating a mean rotational speed $\omega_{mi(i+1)}$ during an expansion stroke of said No. i cylinder on the basis of a formula of $$\left(\frac{\omega_{c(i+1)} + \omega_{maxi}}{2}\right);$$

(i) calculating a ratio Di(i+1) of change in rotational speed during said expansion stroke of said No. (i+1) cylinder on the basis of a formula of $((\omega_{maxi} - \omega_{c(i+1)}/\omega_{mi(i+1)})$;

(j) determining a mean pressure P$\omega$i of said No. i cylinder in accordance with the following formula:

$$P\omega i = (Dii \cdot \omega^2_{mii} - Di(i+1) \cdot \omega^2_{mi(i+1)})I/Vh$$

where: I is a moment of inertia, and Vh is a volume of cylinder;

(k) calculating a mean value $\overline{P\omega i}$ of a mean pressure P$\omega$i on the basis of a plurality of said mean pressures P$\omega$i;

(l) determining a deviation $\Delta$Pii of an indicated mean effective pressure Pii of said No. i cylinder from a subtractive result of (P$\omega$i $- \overline{P\omega i}$); and (m) outputting an indication of said deviation of the indicated mean effective pressure Pii of said No. i cylinder to an output device.

4. Apparatus for determining a deviation in the indicated mean effective pressure of an engine comprising:

(a) means for generating speed signals related to crankshaft rotational speeds at a plurality of crankshaft angles;

(b) means for: (1) determining a plurality of times a mean pressure for a selected cylinder based on said speed signals, and (2) determining a deviation of an indicated mean effective pressure for said selected cylinder in accordance with the difference between said mean pressure and an average mean pressure taken over said plurality of mean pressure determinations; and (c) means for outputting an indication of said deviation of an indicated mean effective pressure for said selected cylinder.

5. Apparatus for determining a deviation in the indicated mean effective pressure of an engine comprising:

(a) means for producing a top dead center signal at a first angular position of a crankshaft corresponding to a top dead center of each of a plurality of cylinders in said engine;

(b) means for producing a plurality of crank angle signals at second angular positions of a crankshaft;

(c) means for determining rotational speeds $\omega_{ci}$ and $\omega_{c(i+1)}$ of the crankshaft at the top dead center of a No. i cylinder and a No. i+1 cylinder of said engine detected on the basis of said top dead center signal in accordance with said crank angle signal, said No. i+1 cylinder reaching top dead center immediately after said No. i cylinder;

(d) means for: (1) determining a mean pressure P$\omega$i of said No. i cylinder in accordance with the following formula:

$$P\omega i = (\omega^2_{c(i+1)} - \omega^2_{ci})I/2Vh$$

where: I is a moment of inertia, and Vh is a volume of cylinder, (2) calculating a mean value $\overline{P\omega i}$ of said mean pressure P$\omega$i, and (3) determining a deviation $\Delta$Pii of an indicated mean effective pressure Pii of said No. i cylinder from a subtractive result of (P$\omega$i $- \overline{P\omega i}$); and (e) means for outputting an indication of said deviation of the indicated mean effective pressure Pii of said No. i cylinder to an output device.

6. Apparatus for determining a deviation according to claim 5, wherein:

said means for producing said top dead center signal and said means for producing said crank angle signals comprise:

a disk solidly secured to one end of said crankshaft of said engine, said disk having a slit associated with said top dead center signal and a plurality of slits associated with said crank angle signal at the outer periphery of said disk, a first light emitting diode and a first photodiode fixedly provided on opposite sides of said disk so that a light from said first light emitting diode is received by said first photodiode through said slit associated with said top dead center signal at the top dead center of the engine, and a second light emitting diode and a second photodiode fixedly provided on opposite sides of said disk so that a light from said second light emitting diode is received by said second photodiode through said slits for the crank angle signal; and said means for determining rotational speeds comprises a counter for counting a fixed frequency signal during a predetermined angular range of said crankshaft.

7. Apparatus for determining a deviation in an indicated mean effective pressure of an engine comprising:
(a) means for producing a top dead center signal at a first angular position of a crankshaft corresponding to a top dead center of a cylinder;
(b) means for producing a plurality of crank angle signals at a plurality of second angular positions of said crankshaft;
(c) means for producing a plurality of fixed frequency signals;
(d) means for counting said fixed frequency signals between a predetermined number of said crank angle signals;
(e) means for: (1) determining a minimum rotational speed $\omega_{ci}$ of said crankshaft at around said top dead center during a compression stroke of a No. i cylinder of said engine in accordance with a count value of said counting means, (2) determining a maximum rotational speed $\omega_{maxi}$ of said crankshaft during an expansion stroke of said No. i cylinder in accordance with the count value of said counting means, (3) calculating a mean rotational speed $\omega_{mii}$ of said No. i cylinder by using the following formula:

$$\omega_{mii} = \frac{\omega_{ci} + \omega_{maxi}}{2}.$$

(4) calculating a ratio Dii of said No. i cylinder by using the following formula:

$$Dii = (\omega_{maxi} - \omega_{ci})/\omega_{mii},$$

(5) determining a minimum rotational speed $\omega_{c(i+1)}$ of said crankshaft at around said top dead center during a compression stroke of a No. (i+1) cylinder in accordance with the count value of said counting means, said No. (i+1) cylinder reaching top dead center immediately after said No. i cylinder,
(6) calculating a mean rotational speed $\omega_{mi(i+1)}$ of said No. (i+1) cylinder by using the following formula:

$$\omega_{mi(i+1)} = \frac{\omega_{c(i+1)} + \omega_{maxi}}{2},$$

(7) calculating a ratio Di(i+1) of said No. (i+1) cylinder by using the following formula:

$$Di(i+1) = (\omega_{maxi} - \omega_{c(i+1)})/\omega_{mi(i+1)}.$$

(8) determining a mean pressure P$\omega$i of No. i cylinder in accordance with the following formula:

$$P\omega i = (Dii \cdot \omega^2_{mii} - Di(i+1) \cdot \omega^2_{mi(i+1)})I/Vh$$

where: I is a moment of inertia and Vh is a volume of cylinder, (9) calculating a mean value $\overline{P\omega i}$ of said mean pressure P$\omega$i, and (10) determining a deviation $\Delta$Pii of an indicated mean effective pressure Pii of said No. i cylinder from a subtractive result of (P$\omega$i − $\overline{P\omega i}$); and
(f) means for outputting an indication of said deviation of the indicated mean effective pressure Pi of said No. i cylinder to an output device.

8. Apparatus for determining a deviation according to claim 7, wherein:

said means for producing said top dead center signal and said means for producing said crank angle signals comprise:

a disk solidly secured to one end of said crankshaft of said engine, said disk having a slit associated with said top dead center signal and a plurality of slits associated with said crank angle signals at the outer periphery of the disk, a first light emitting diode and a first photodiode fixedly provided on opposite sides of said disk so that a light from said first light emitting diode is received by said first photodiode through said slit associated with said top dead center signal at the top dead center of the engine, and a second light emitting diode and a second photodiode fixedly provided on opposite sides of said disk so that a light from said second light emitting diode is received by said second photodiode through said slits associated with said crank angle signals; and said counting means comprises first and second counters, each of said counters counting said fixed frequency signals alternately to continuously produce a rotational speed between a predetermined number of said crank angle signals.

* * * * *